United States Patent
Ko et al.

(10) Patent No.: US 10,903,721 B2
(45) Date of Patent: Jan. 26, 2021

(54) APPARATUS FOR CHARGING ELECTRIC MOBILITY

(71) Applicants: Hyundai Motor Company, Seoul (KR); Kia Motors Corporation, Seoul (KR)

(72) Inventors: Kyu-Beom Ko, Incheon (KR); Jin-Cheol Shin, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/653,622

(22) Filed: Oct. 15, 2019

(65) Prior Publication Data

US 2020/0136466 A1  Apr. 30, 2020

(30) Foreign Application Priority Data

Oct. 24, 2018 (KR) .................. 10-2018-0127352

(51) Int. Cl.
*B60L 53/35* (2019.01)
*H02K 7/18* (2006.01)
*B60W 30/18* (2012.01)

(52) U.S. Cl.
CPC ..... *H02K 7/1846* (2013.01); *B60W 30/18127* (2013.01)

(58) Field of Classification Search
CPC ....... H02K 7/1846; H02K 21/22; Y02T 10/70
See application file for complete search history.

(56) References Cited

U.S. PATENT DOCUMENTS

| | | | |
|---|---|---|---|
| 2013/0021011 A1* | 1/2013 | Okuda | H02M 3/158 323/282 |
| 2017/0190335 A1* | 7/2017 | Gillett | A63C 17/12 |
| 2019/0232812 A1* | 8/2019 | Itoh | B60L 53/35 |

FOREIGN PATENT DOCUMENTS

KR  10-0945671 B1  2/2010

* cited by examiner

*Primary Examiner* — Muhammad S Islam
(74) *Attorney, Agent, or Firm* — Morgan, Lewis & Bockius LLP

(57) ABSTRACT

An apparatus of charging an electric mobility may include a tire wheel having an external surface configured to be coupled to a tire and an internal surface in which an empty space is formed, a battery accommodated in the empty space of the internal surface of the tire wheel and mounted, like the tire wheel, on a rotation shaft fixed to the tire wheel to be rotationally driven, a stopper configured to selectively couple the battery to the rotation shaft, and a controller connected to the stopper and configured to control selective coupling of the rotation shaft to the battery by the stopper, wherein the stopper is controlled by the controller so that the battery is charged using an induced electromotive force generated between a coil wound on the battery and a permanent magnet which is mounted to face the battery.

19 Claims, 16 Drawing Sheets

APPARATUS FOR CHARGING ELECTRIC MOBILITY

CROSS-REFERENCE TO RELATED APPLICATIONS

The present application claims priority to Korean Patent Application No. 10-2018-0127352, filed on Oct. 24, 2018, the entire contents of which is incorporated herein for all purposes by this reference.

BACKGROUND OF THE INVENTION

Field of the Invention

The present invention relates to an apparatus of charging a battery mounted at an electric mobility, which is provided in an internal space of a wheel of the electric mobility and, when the electric mobility is braked while driving, which is configured for converting braking energy of the electric mobility into electrical energy to charge the battery.

Description of Related Art

Recent trends in mobility are replacing fossil energy to increase the number of mobility using electrical energy, and the spread of single-person mobility which individuals carry and travel short distances increases.

For example, as shown in FIG. 1 and FIG. 2, there are electric mobilities such as an electric scooter 1, an electric bicycle 2, and the like. The spread of the electric mobilities increases for moving a short distance in urban area, or leisure.

The electric mobility drives by charging electric power in a battery mounted at the electric mobility in advance and by driving a motor mounted at the electric mobility by the electric power charged in the battery.

Since the electric mobility drives until the electric power charged in the battery is exhausted, the hours of use and a mileage of the electric mobility depend on a capacity of the battery. To increase the hours of use and mileage of the electric mobility, it is required to increase the capacity of the battery. However, when the capacity of the battery is increased due to the nature of the electric mobility carried by the individual, a weight of the electric mobility is increased such that there is a problem in that portability is difficult.

Therefore, even though the capacity of the battery is limited, a method needs to be provided for increasing the hours of use and mileage of the electric mobility.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus of charging a battery mounted at an electric mobility, which is provided in an internal space of a wheel of the electric mobility and, when the electric mobility is braked while driving, which is configured for converting braking energy of the electric mobility into electrical energy to charge the battery.

Other objects and advantages of the present invention may be understood by the following description and become apparent with reference to the exemplary embodiments of the present invention. Also, it is obvious to those skilled in the art to which an exemplary embodiment of the present invention pertains that the objects and advantages of the present invention may be realized by the means as claimed and combinations thereof.

In accordance with various exemplary embodiments of the present invention, there is provided an apparatus of charging an electric mobility, which includes a tire wheel having an external surface configured to be coupled to a tire and an internal surface in which an empty space is formed, a battery accommodated in the empty space of the internal surface of the tire wheel and mounted, like the tire wheel, on a rotation shaft fixed to the tire wheel to be rotationally driven, a stopper configured to selectively couple the battery to the rotation shaft, and a controller connected to the stopper and configured to control selective coupling of the rotation shaft to the battery by the stopper, wherein the stopper may be controlled by the controller such that the battery may be charged using an induced electromotive force generated between a coil wound on the battery and a permanent magnet which is mounted to face the battery.

When the electric mobility is driving, the controller may be configured to control the stopper to couple the battery to the rotation shaft.

When the electric mobility is braked, the controller may be configured to control the stopper to decouple the battery from the rotation shaft.

The permanent magnet may be inserted and mounted in the tire wheel.

The battery and the permanent magnet may be mounted to face each other in the empty space of the internal surface of the tire wheel.

The permanent magnet may be connected to the tire wheel to be integrally moved therewith.

The battery may be accommodated in a battery housing including a non-magnetic material.

In accordance with various exemplary embodiments of the present invention, there is provided an apparatus of charging an electric mobility, which includes a tire wheel having an external surface configured to be coupled to a tire and an internal surface in which an empty space is formed, a battery accommodated in the empty space of the internal surface of the tire wheel and mounted, like the tire wheel, on a rotation shaft fixed to the tire wheel to be rotationally driven, a stopper configured to selectively couple the battery to the rotation shaft, and a controller connected to the stopper and configured to control selective coupling of the rotation shaft to the battery by the stopper, wherein when the electric mobility is braked, the controller may be configured to control the battery to generate a rotating magnetic field for driving an induction motor to transmit the rotating magnetic field to the induction motor and may control the induction motor to generate a current by the transmitted rotating magnetic field to transmit the generated current to the battery via a wireless transmission and reception pad.

When the electric mobility is driving, the controller may be configured to control the stopper to couple the battery to the rotation shaft.

When the electric mobility is braked, the controller may be configured to control the stopper to decouple the battery from the rotation shaft.

The battery may include a coil for generating an induced current generated by an electromagnetic field generated by the wireless transmission and reception pad.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
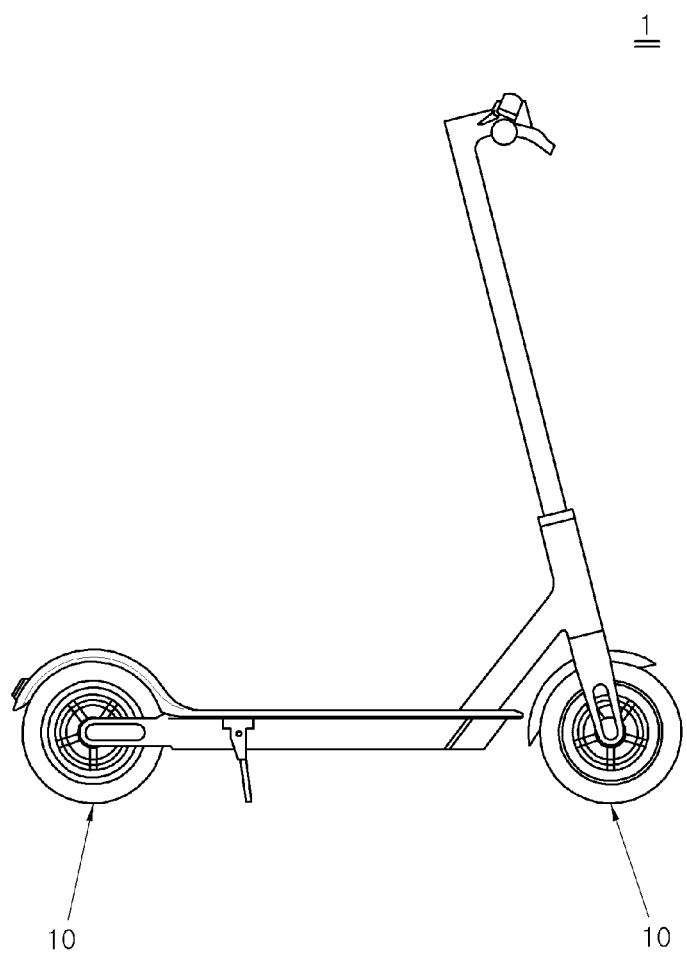
FIG. 1 is a diagram illustrating an electric scooter.
Figure 2:
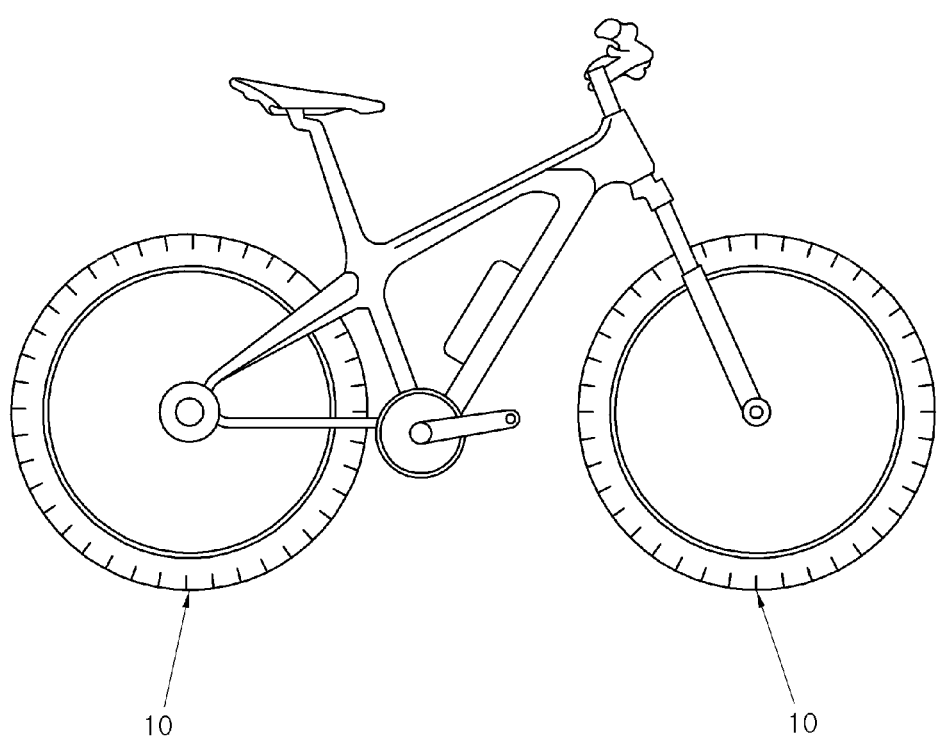
FIG. 2 is a diagram illustrating an electric bicycle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings. However, in the following description and the accompanying drawings, if it is determined that well-known functions or configurations may obscure the gist of the present invention, detailed descriptions thereof will be omitted. Furthermore, it is noted that the same components are denoted by the same reference numerals throughout the drawings.

Terms or words used herein and the appended claims may not be construed to be limited to ordinary or dictionary meanings, and, these may be construed in accordance with the meaning and concept consistent with the technical spirit of the present invention according to the principle in that inventors can properly define concepts of terms to describe their inventions with the best manner.

Therefore, the exemplary embodiments of the present invention and the configurations illustrated in the drawings are merely the most exemplary embodiments of the present invention, and do not represent all the technical spirits of the present invention, so that it may be understood that various equivalents and modifications, which are configured for replacing the exemplary embodiments and the configurations, are possible at the time of filing the present application.

Some components are exaggerated, omitted, or schematically illustrated in the accompanying drawings shown, and a size of each component does not substantially reflect an actual size thereof. The present invention is not limited by a relative size or a spacing illustrated in the accompanying drawings.

When a component is referred to as "being included" in a portion, this means that other component may be further included rather than not be included in the portion unless the context clearly describes otherwise. Furthermore, when a portion is referred to as being "connected to" other portion, this includes not only "being directly connected to" but also "being electrically connected to" by interposing another element between the portion and the other portion.

Unless the context clearly dictates otherwise, the singular form includes the plural form. It should be understood that terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Embodiments of the present invention will be fully described in a detail below which is suitable for implementation by those skilled in the art with reference to the accompanying drawings. However, the present invention may be implemented in various different forms, and thus it is not limited to embodiments to be described herein.

In the drawings, some portions not related to the description will be omitted to clearly describe the present invention, and similar reference numerals are provided to similar components throughout the present invention.

Hereinafter, exemplary embodiments of the present invention will be described in detail with reference to the accompanying drawings.

Figure 3:
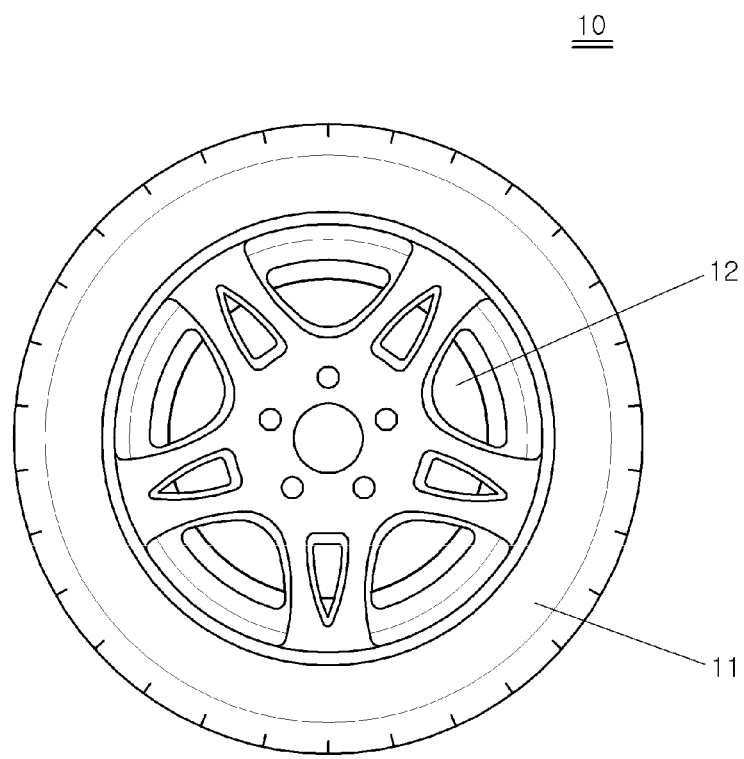
FIG. 3 is a diagram illustrating a charging device of an electric mobility according to an exemplary embodiment of the present invention.
Figure 4:
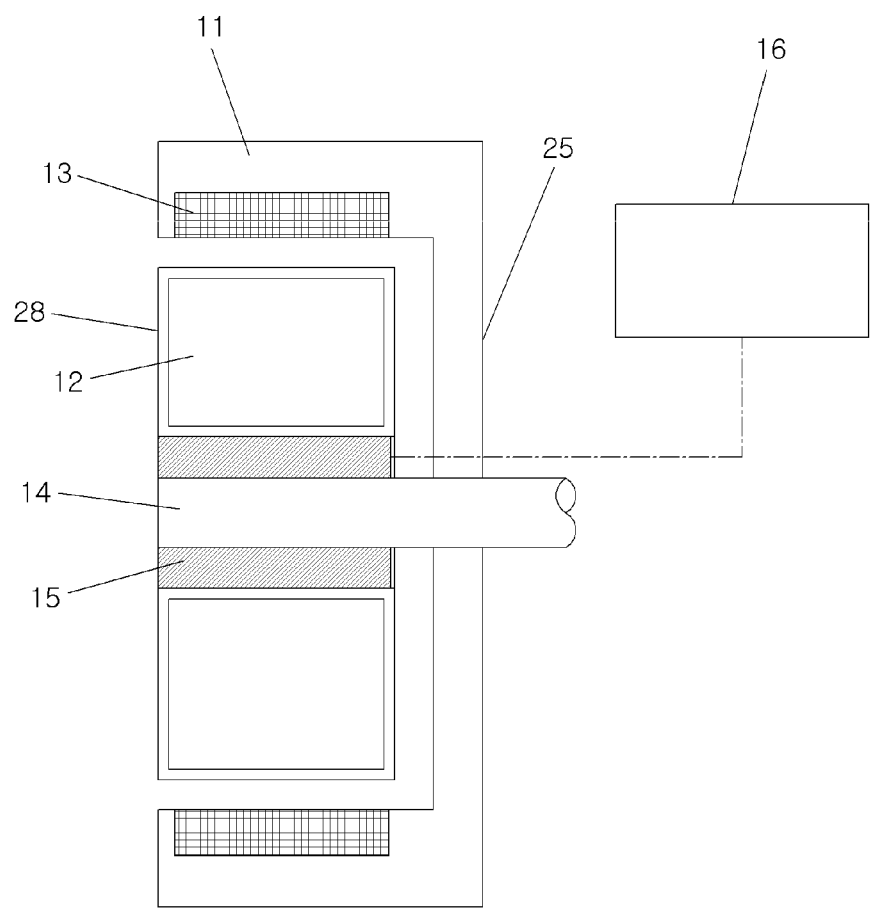
FIG. 4 is a cross-sectional view of a side surface of the charging device of the electric mobility of FIG. 3 according to an exemplary embodiment of the present invention.
Figure 5:
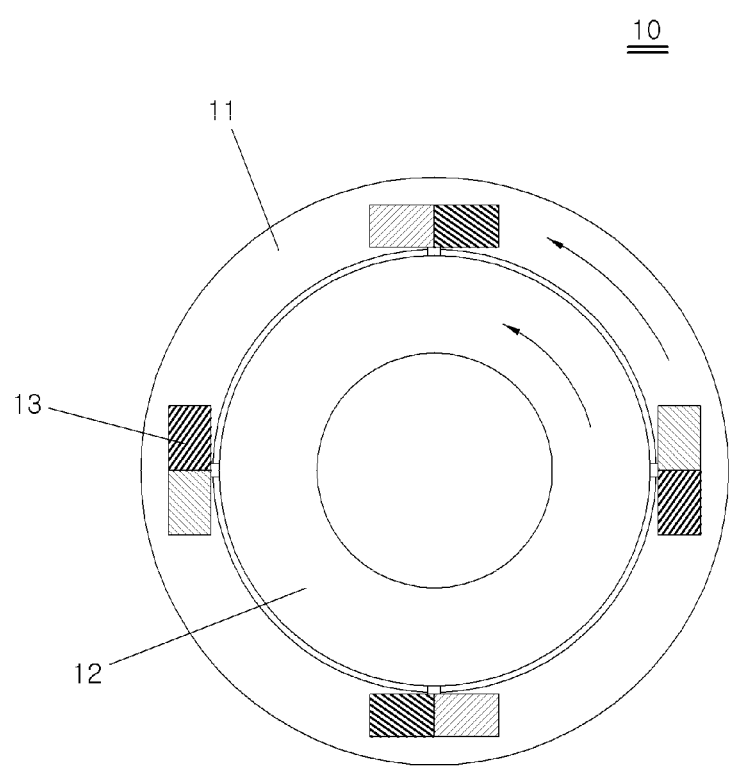
FIG. 5 is a diagram illustrating a case in which the electric mobility of FIG. 4 is in a driving state.
Figure 6:
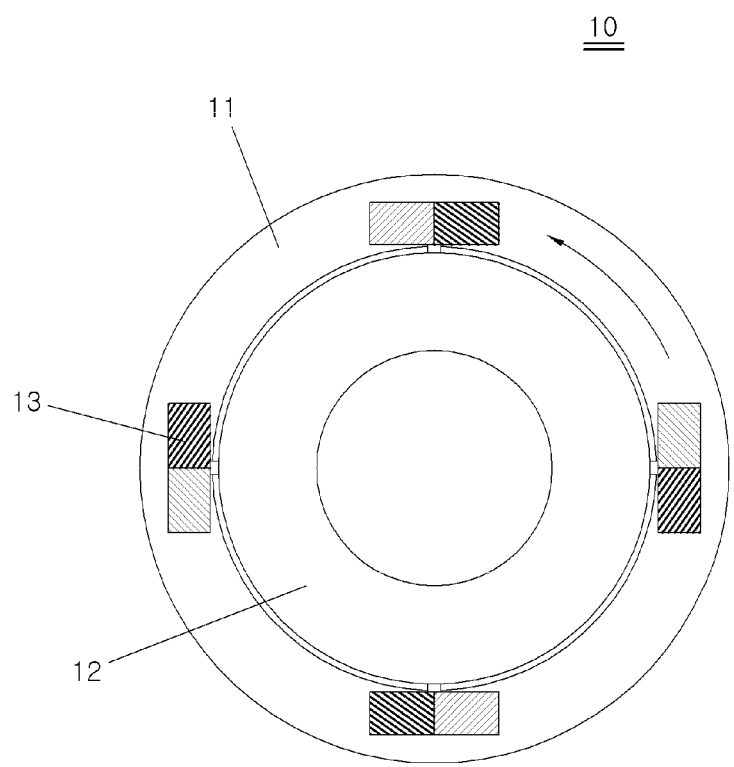
FIG. 6 is a diagram illustrating a case in which the electric mobility of FIG. 4 is in a braking state.
Figure 7:
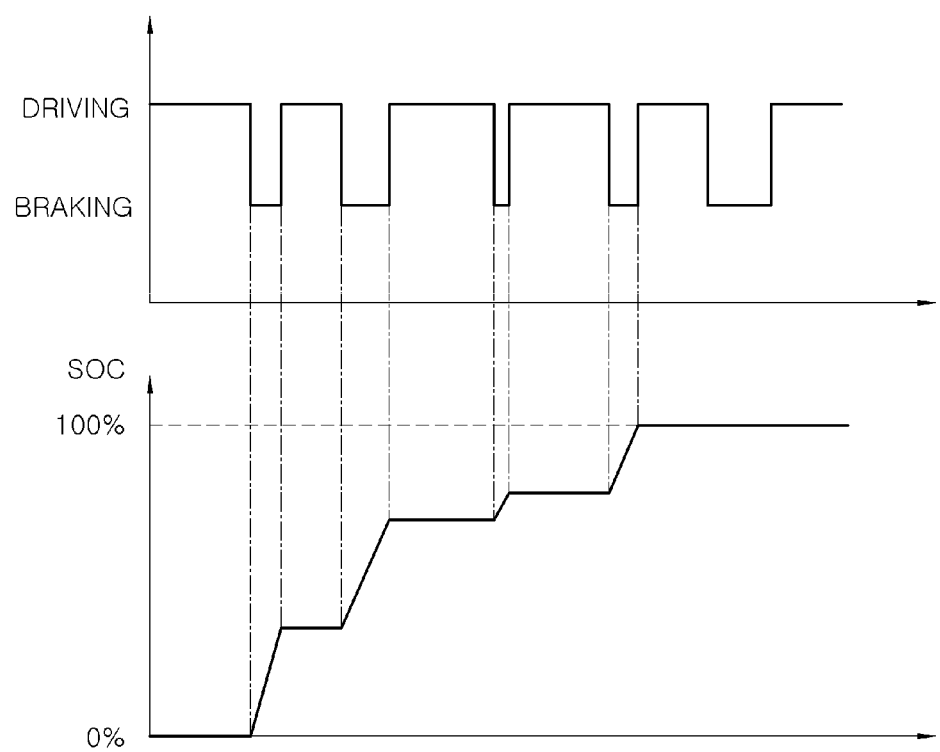
FIG. 7 is a diagram illustrating a battery charging state according to the driving or braking state of the electric mobility.

FIG. 3 is a diagram illustrating a charging device of an electric mobility according to an exemplary embodiment of the present invention, FIG. 4 is a cross-sectional view of a side surface of the charging device of the electric mobility of FIG. 3 according to an exemplary embodiment of the present invention, FIG. 5 is a diagram illustrating a case in which the electric mobility of FIG. 4 is in a driving state, FIG. 6 is a diagram illustrating a case in which the electric mobility of FIG. 4 is in a braking state, and FIG. 7 is a diagram illustrating a battery charging state according to the driving or braking state of the electric mobility.

Referring to FIG. 3 and FIG. 4, a charging device of an electric mobility (hereinafter, referred to as a "charging device" 10) according to an exemplary embodiment of the present invention may implement a battery charging structure on a wheel of an electric mobility to accumulate electrical energy using braking energy of the electric mobility. The charging device 10 is maintained in a non-charging state when the electric mobility is driving, whereas the charging device 10 is operated in a charging state when electric mobility is braked.

The charging device 10 includes a tire wheel 11 having an external surface configured to be coupled to a tire and an internal surface forming an empty space, a battery 12 accommodated in the empty space of the internal surface of the tire wheel 11 and mounted, like the tire wheel 11, on a rotation shaft 14 to be rotationally driven, a stopper 15 for coupling or decoupling the battery 12 to or from the rotation shaft 14, and a controller 16 for controlling coupling or decoupling of the stopper 15 to or from the rotation shaft 14. Here, the controller 16 may be at least one processor.

Permanent magnets 13 are mounted to be inserted into the tire wheel 11 at regular intervals, facing a coil wound on the battery 12.

In an exemplary embodiment of the present invention, the stopper 15 is an actuator electrically connected to the controller 15, The battery 12 is a toroidal type battery on which the coil is wound. The coil may be entirely wound along a circumference of the battery 12. Alternatively, the coil may be wound to face positions at which the permanent magnets 13 are mounted. For example, when the permanent magnets 13 are mounted at intervals of 90 degrees, the coils are also wound on battery 12 at an interval of 90 degrees.

Furthermore, the battery 12 is accommodated in a battery housing 28 made of a non-magnetic material, and a bobbin is provided at a portion at which the coil is wound.

Meanwhile, when the electric mobility is driving, the tire wheel 11 and the battery 12 are rotated together. However, when the electric mobility is braked, the tire wheel 11 is rotated but the battery 12 is not rotated.

Since the tire wheel 11 is always fixed to the rotation shaft 14, the tire wheel 11 is always rotated when the electric mobility is driving or is braked.

However, owing to an operation of the stopper 15 for coupling or decoupling the battery 12 to or from the rotation shaft 14, when the electric mobility is driving, the battery 12 is coupled to the rotation shaft 14 to be rotatable with the tire wheel 11, but unlike the tire wheel 11, when the electric mobility is braked, the battery 12 is decoupled from the rotation shaft 14 to not be rotated. In the instant case, the battery 12 is configured as a rotor and the permanent magnet 13 is configured as a stator.

When either of the coil wound on the battery 12 or the permanent magnets 13 mounted at the tire wheel 11 is rotated, an induced electromotive force is generated between the permanent magnet 13 and the coil such that a current flows on the coil. In the instant case, the battery 12 may be charged by the current flowing on the coil.

That is, when the electric mobility is driving, the controller 16 controls the stopper 15 to couple the battery 12 to the rotation shaft 14, maintaining a state in which the battery 12 is rotatable with the tire wheel 11 (see FIG. 5).

Furthermore, when the electric mobility is braked, the controller 16 controls the stopper 15 to decouple the battery 12 from the rotation shaft 14, preventing a rotation of the battery 12 even though the tire wheel 11 is remained in a rotatable (see FIG. 6). In the instant case, the controller 16 controls the battery 12 to be charged with the flowing current generated due to the induced electromotive force.

As described above, when the electric mobility is driving, the battery 12 is not charged, whereas when the electric mobility is braked, the battery 12 is charged.

Referring to FIG. 7, when the electric mobility is driving, a state of charge (SOC) value of the battery 12 remains in a constant state, whereas when the electric mobility is braked, the SOC value of the battery 12 increases.

That is, when the electric mobility is driving, the tire wheel 11 and the battery 12 are rotated together such that the induced electromotive force is not generated. However, the when electric mobility is braked, since the tire wheel 11 is rotated and the battery 12 is not rotated, the induced electromotive force is generated between the permanent magnets 13 and the coil to charge the battery 12.

Figure 8:
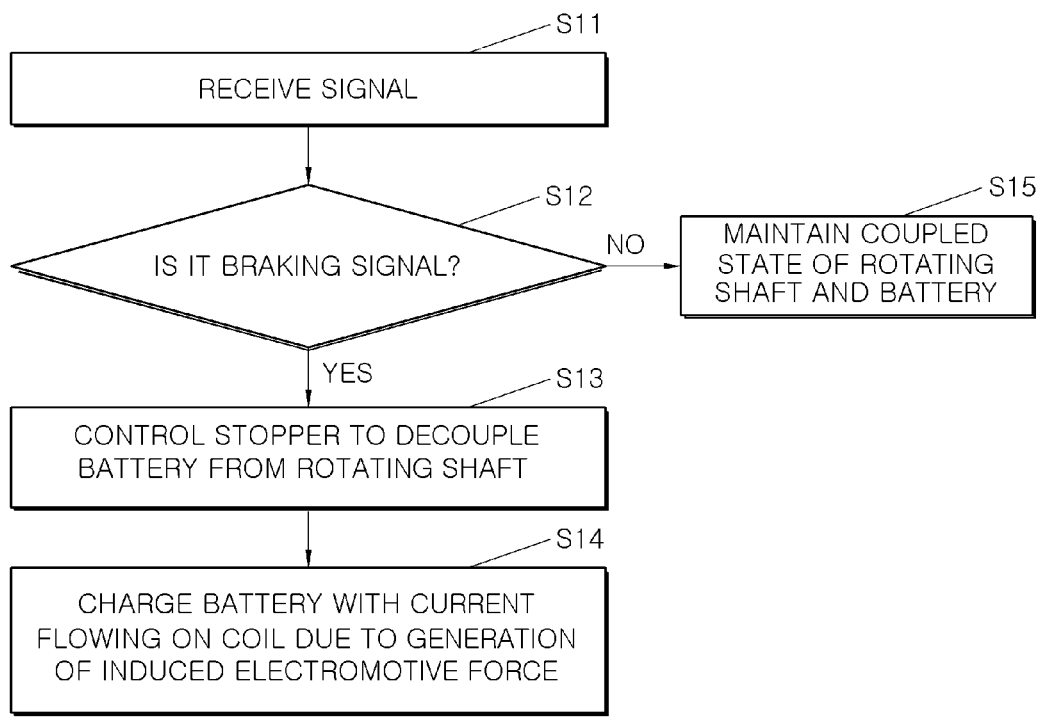
FIG. 8 is a diagram illustrating an operation method of a controller of FIG. 4.

FIG. 8 is a diagram illustrating an operation method of a controller of FIG. 4.

When the controller 16 received a braking signal from the outside thereof (S11 and S12), the controller 16 controls the stopper 15 to decouple the battery 12 coupled to the rotation shaft 14 (S13). In the instant case, the controller 16 controls the battery 12 to be charged with the current flowing on the coil, which is generated due to the induced electromotive force (S14).

Otherwise, when a signal received from the outside thereof is not the brake signal (S11 and S12), the controller 16 maintains the coupled state of the rotation shaft 14 and the battery 12 (S15).

Figure 9:
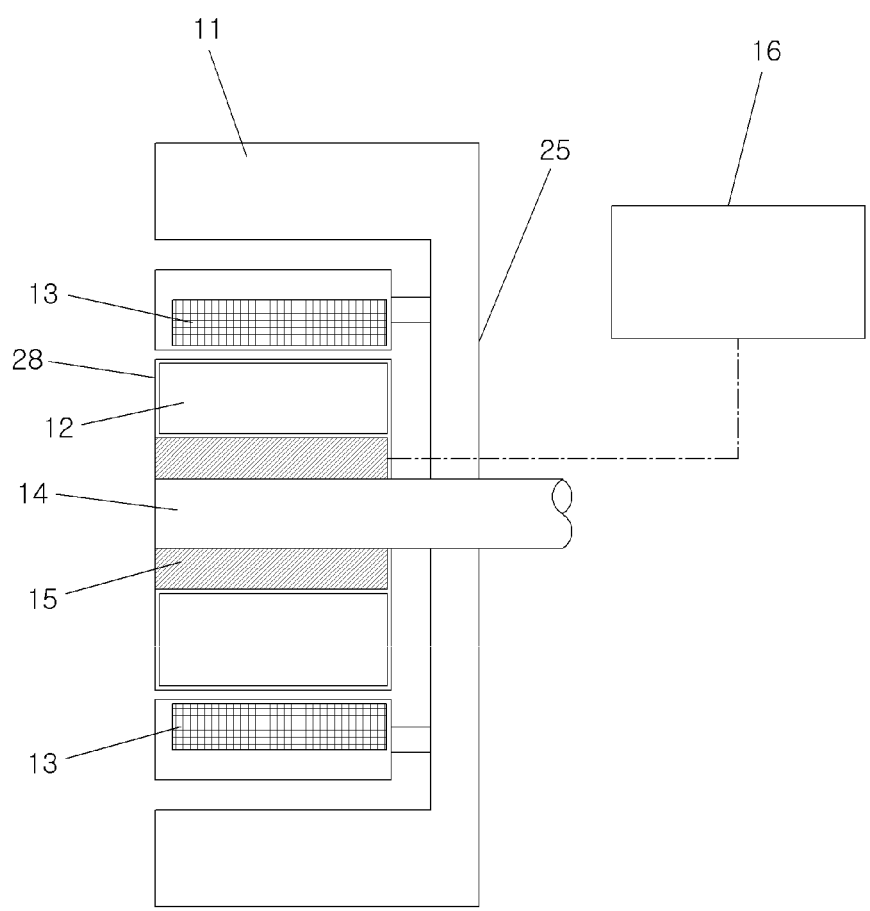
FIG. 9 is a cross-sectional view of a side surface of a charging device of the electric mobility of FIG. 3 according to another exemplary embodiment of the present invention.
Figure 10:
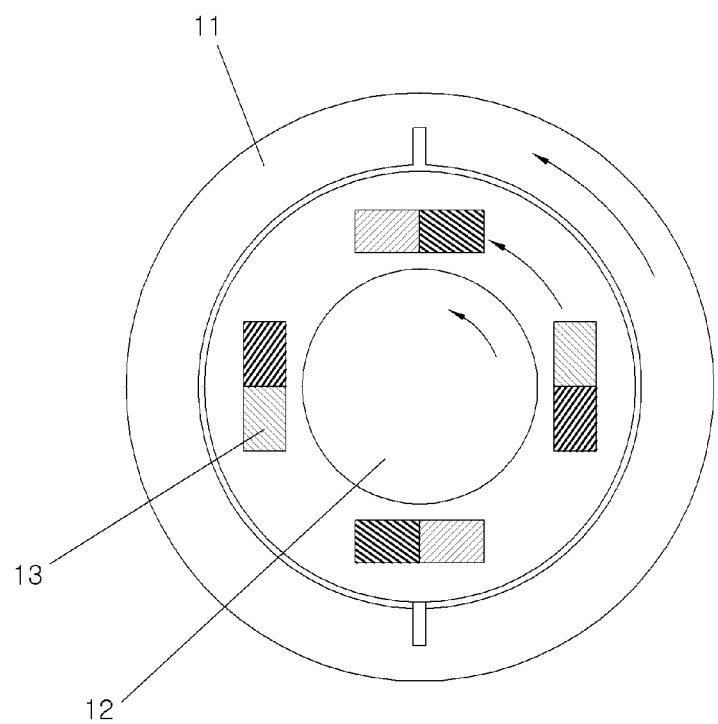
FIG. 10 is a diagram illustrating a case in which the electric mobility of FIG. 9 is in a driving state.
Figure 11:
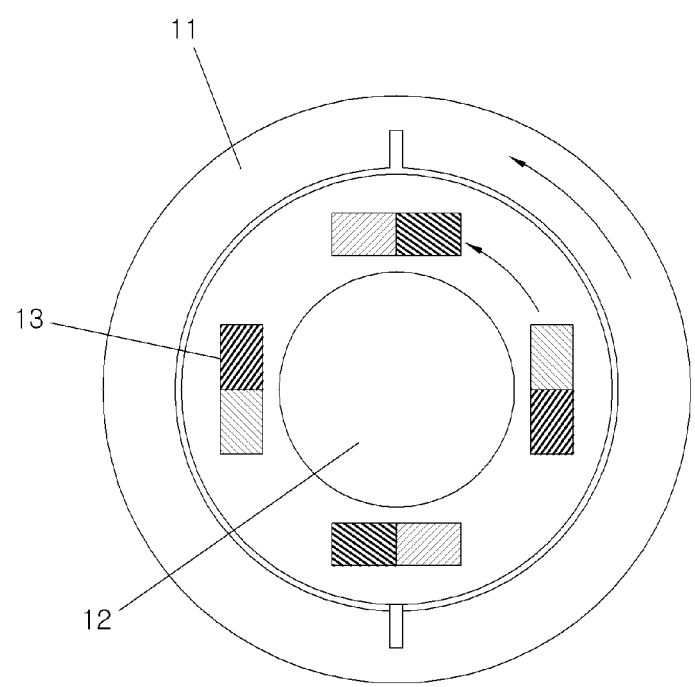
FIG. 11 is a diagram illustrating a case in which the electric mobility of FIG. 9 is in a braking state.

FIG. 9 is a cross-sectional view of a side surface of a charging device of the electric mobility of FIG. 3 according to another exemplary embodiment of the present invention, FIG. 10 is a diagram illustrating a case in which the electric mobility of FIG. 9 is in a driving state, and FIG. 11 is a diagram illustrating a case in which the electric mobility of FIG. 9 is in a braking state.

Here, a case in which the battery 12 and the permanent magnet 13 are mounted to face each other inside and outside the empty space of the internal surface of the tire wheel 11 is described.

The battery 12 is mounted at the internal surface to serve as a stator and is coupled to or decoupled from the rotation shaft 14 by the stopper 15. That is, when the electric mobility is in a driving state, the battery 12 is decoupled from the rotation shaft 14 by the stopper 15, whereas when the electric mobility is in a braking state, the battery 12 is coupled to the rotation shaft 14 by the stopper 15.

The permanent magnet 13 is mounted at a flange 25 connecting the rotation shaft 14 and the tire wheel to serve as a rotor and is connected to the tire wheel 11 via the flange 25 to be moved integrally. That is, unlike the battery 12, the permanent magnet 13 is always rotated by being rotated or fixed by the stopper 15 (see FIG. 10, and FIG. 11).

The components shown in FIG. 9 are the same as those shown in FIG. 4, so a detailed description thereof will be omitted.

Figure 12:
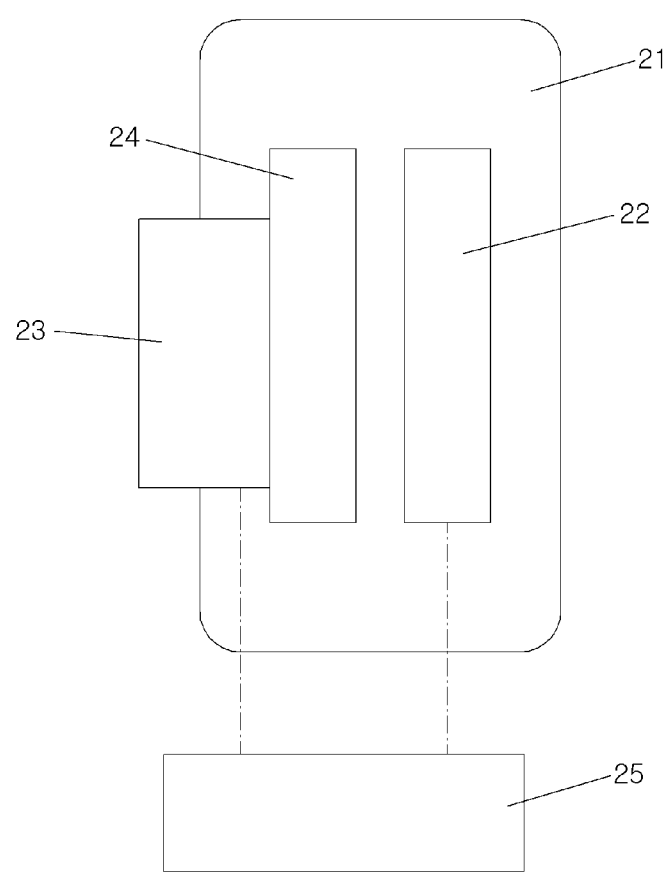
FIG. 12 is a cross-sectional view of a side surface of a charging device of the electric mobility of FIG. 3 according to yet another exemplary embodiment of the present invention.
Figure 13:
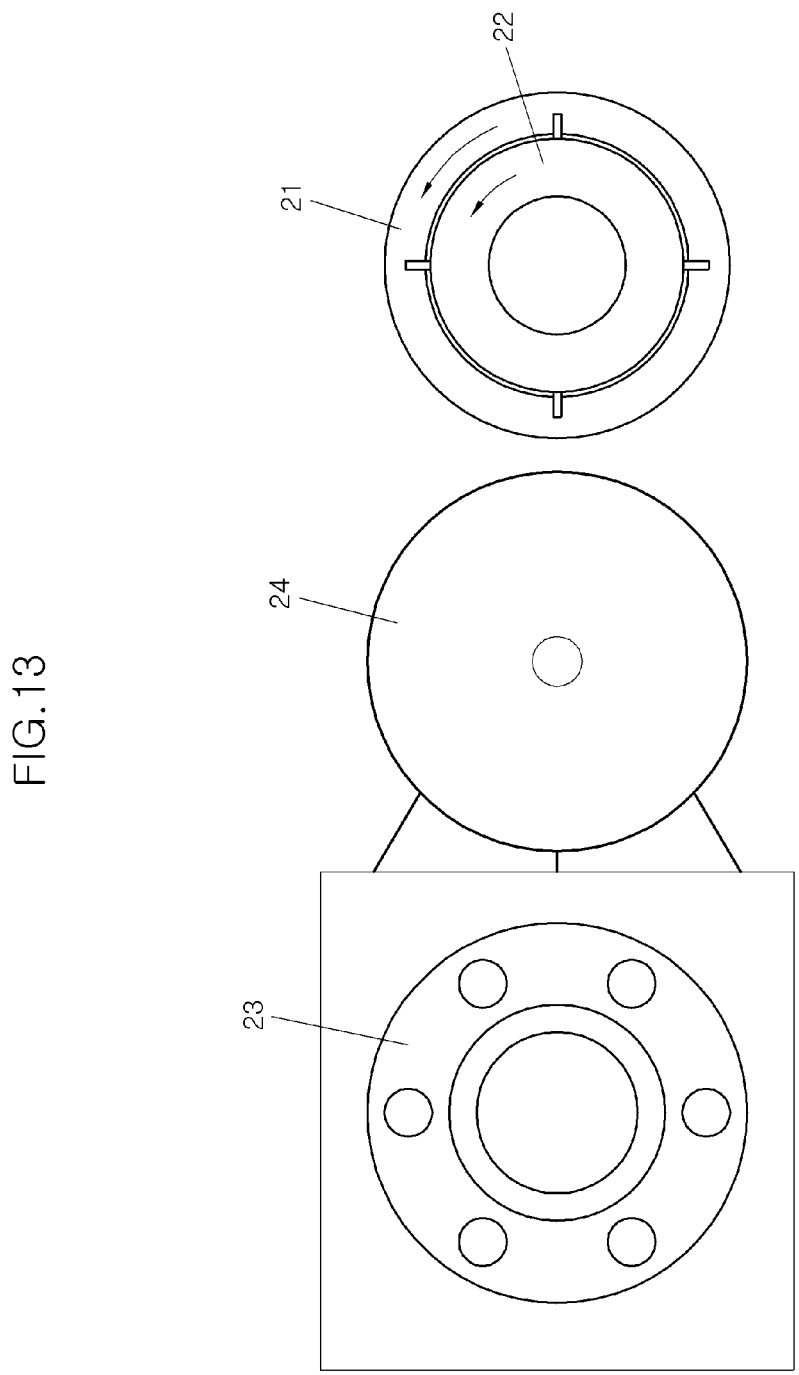
FIG. 13, FIG. 14 and FIG. 15 are diagrams for describing an operation procedure of a charging device of the electric mobility of FIG. 12.
Figure 14:
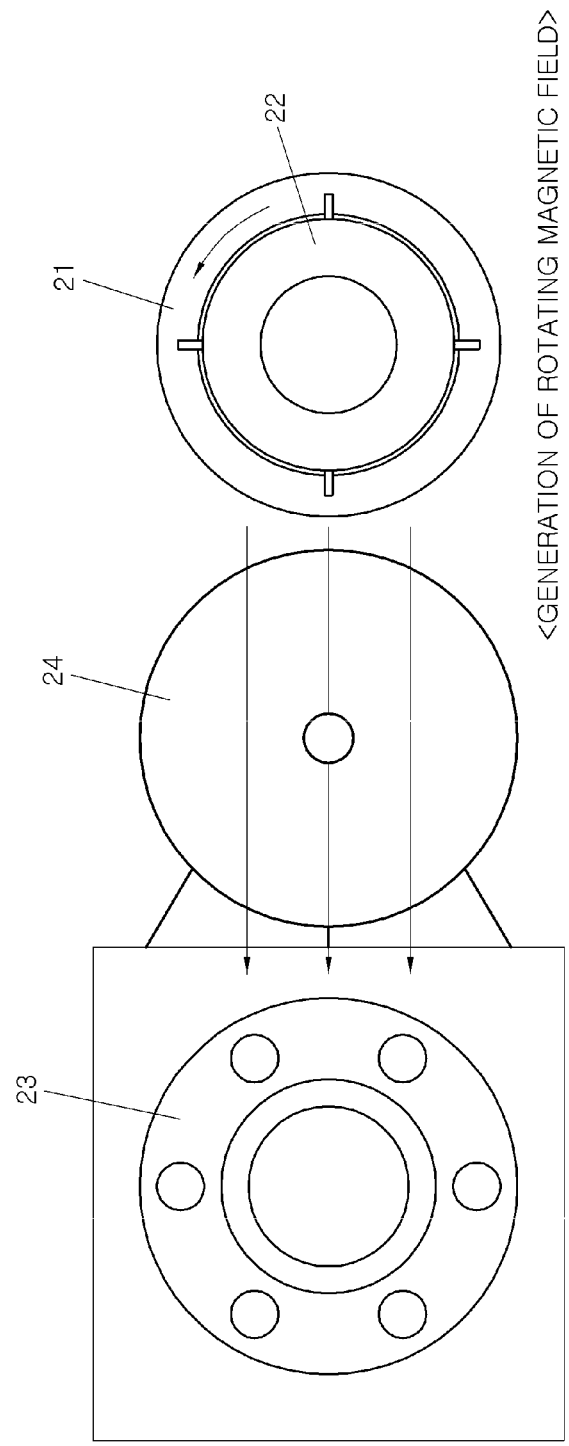
Figure 15:
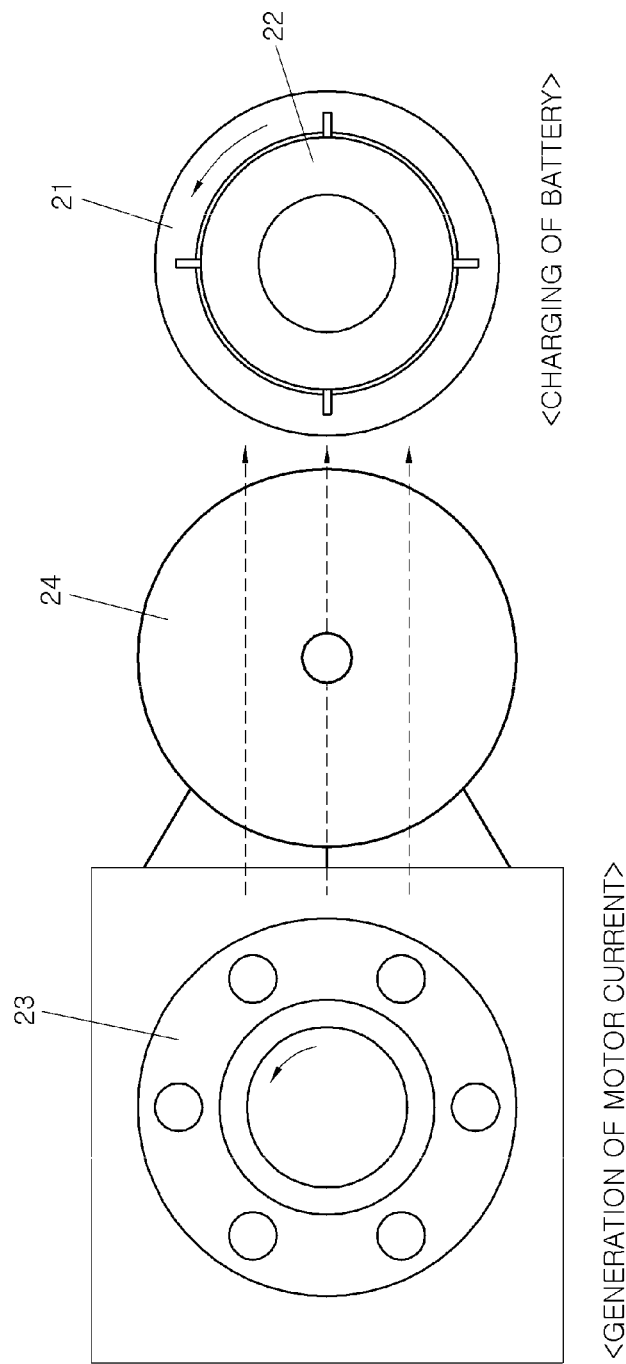

FIG. 12 is a cross-sectional view of a side surface of a charging device of the electric mobility of FIG. 3 according to yet another exemplary embodiment of the present invention, and FIG. 13, FIG. 14 and FIG. 15 are diagrams for describing an operation procedure of a charging device of the electric mobility of FIG. 12.

A charging device 20 of an electric mobility shown in FIG. 12 is configured such that a battery 22 is mounted in an empty space inside a tire wheel 21. When the electric mobility is braked, the battery 22 generates a rotating magnetic field for driving an induction motor 23 and transmits the rotating magnetic field to the induction motor 23 via a wireless transmission and reception pad 24. The battery 22 receives a current generated by the induction motor 23 via the wireless transmission and reception pad 24 and is wirelessly charged.

Referring to FIGS. 13 to 15, when the electric mobility is driving, the tire wheel 21 and the battery 22 are rotated together.

However, when the electric mobility is braked, the tire wheel 21 is continuously rotated, but the battery 22 is not rotated.

In the instant case, the battery 22 generates the rotating magnetic field transmitted to the induction motor 23 and thus the induction motor 23 generates the current. The controller 25 controls the rotating magnetic field generated by battery 22 to be transmitted to the induction motor 23 and then controls the current generated by the induction motor 23 to the battery 22 via the wireless transmission and reception pad 24.

A coil is embedded in the battery 22 so that the battery 22 is wirelessly charged with the current generated by the induction motor 23 through the coil. A primary coil for generating an electromagnetic field is embedded in the wireless transmission and reception pad 24, and a secondary coil for receiving an induced current is embedded in the battery 22. Thus, the battery 22 is charged with a current generated on the secondary coil by an electromagnetic induction phenomenon.

Figure 16:
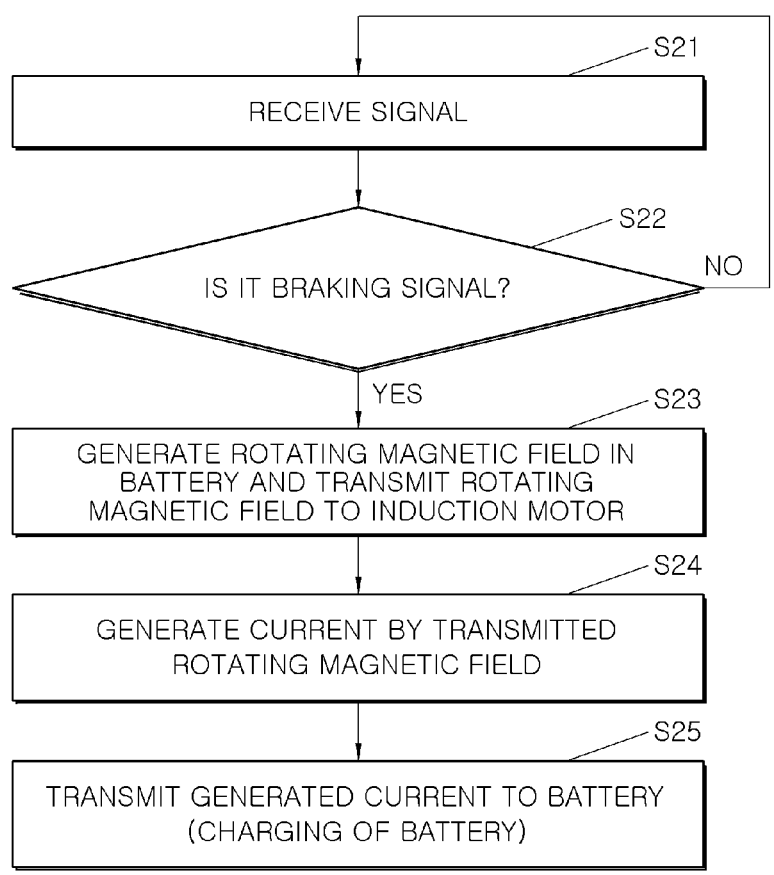
FIG. 16 is a diagram illustrating an operation method of a controller of FIG. 12.

FIG. 16 is a diagram illustrating an operation method of a controller of FIG. 12.

When a braking signal is received from the outside thereof (S21 and S22), the controller 25 generates a rotating magnetic field in the battery 22 and transmits the rotating magnetic field to the induction motor 23 (S23).

Thereafter, when the induction motor 23 generates a current by the rotating magnetic field (S24), the controller 25 transmits the generated current to the battery 22 to charge the battery 22 (S25).

In accordance with various aspects of the present invention, a charging device is provided in an internal space of a wheel of an electric mobility and, when the electric mobility is braked while driving, the charging device is configured for converting braking energy of the electric mobility into electrical energy to charge the battery.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of charging an electric mobility, the apparatus comprising:
    a tire wheel having an external surface configured to be coupled to a tire and an internal surface in which an empty space is formed;
    a battery accommodated in the empty space of the internal surface of the tire wheel and mounted on a rotation shaft fixed to the tire wheel to be rotationally driven;
    a stopper configured to selectively couple the battery to the rotation shaft; and
    a controller connected to the stopper and configured to control selective coupling of the rotation shaft to the battery by the stopper,
    wherein the stopper is controlled by the controller so that the battery is charged using an induced electromotive force generated between a coil wound on the battery and a permanent magnet which is mounted to face the battery.

2. The apparatus of charging the electric mobility of claim 1,
    wherein, when the electric mobility is driving, the controller is configured to control the stopper to couple the battery to the rotation shaft.

3. The apparatus of charging the electric mobility of claim 1,
    wherein, when the electric mobility is braked, the controller is configured to control the stopper to decouple the battery from the rotation shaft.

4. The apparatus of charging the electric mobility of claim 1,
    wherein the permanent magnet is inserted and mounted in the tire wheel to face the battery.

5. The apparatus of charging the electric mobility of claim 1,
    wherein the permanent magnet is positioned between the internal surface of the tire wheel and an external surface of the battery as a rotor of the apparatus and mounted to a flange fixedly connected to the tire wheel and the rotation shaft.

6. The apparatus of charging the electric mobility of claim 1,
    wherein the battery and the permanent magnet are mounted to face each other in the empty space of the internal surface of the tire wheel.

7. The apparatus of charging the electric mobility of claim 6,
    wherein the permanent magnet is connected to the tire wheel via a flange fixedly connected to the tire wheel and the rotation shaft to be integrally moved with the tire wheel.

8. The apparatus of charging the electric mobility of claim 1,
    wherein the battery is accommodated in a battery housing made of a non-magnetic material.

9. The apparatus of charging the electric mobility of claim 1,
    wherein the stopper is positioned between the rotation shaft and the battery.

10. An apparatus of charging an electric mobility, the apparatus comprising:

a tire wheel having an external surface configured to be coupled to a tire and an internal surface in which an empty space is formed;

a battery accommodated in the empty space of the internal surface of the tire wheel and fixed to a rotation shaft fixed to the tire wheel to be rotationally driven;

a stopper configured to selectively couple the battery to the rotation shaft; and a controller connected to the stopper and configured to control selective coupling of the rotation shaft to the battery by the stopper, wherein when the electric mobility is braked, the controller is configured to control the battery to generate a rotating magnetic field for driving an induction motor to transmit a rotating magnetic field to the induction motor and is configured to control the induction motor to generate a current by the transmitted rotating magnetic field to transmit the generated current to the battery via a wireless transmission and reception pad.

11. The apparatus of charging the electric mobility of claim 10, wherein, when the electric mobility is driving, the controller is configured to control the stopper to couple the battery to the rotation shaft.

12. The apparatus of charging the electric mobility of claim 10, wherein, when the electric mobility is braked, the controller is configured to control the stopper to decouple the battery from the rotation shaft.

13. The apparatus of charging the electric mobility of claim 11, wherein the battery includes a coil for generating an induced current generated by an electromagnetic field generated by the wireless transmission and reception pad.

14. The apparatus of charging the electric mobility of claim 10, wherein the permanent magnet is inserted and mounted in the tire wheel to face the battery.

15. The apparatus of charging the electric mobility of claim 10, wherein the permanent magnet is positioned between the internal surface of the tire wheel and an external surface of the battery as a rotor of the apparatus and mounted to a flange fixedly connected to the tire wheel and the rotation shaft.

16. The apparatus of charging the electric mobility of claim 10, wherein the battery and the permanent magnet are mounted to face each other in the empty space of the internal surface of the tire wheel.

17. The apparatus of charging the electric mobility of claim 16, wherein the permanent magnet is connected to the tire wheel via a flange fixedly connected to the tire wheel and the rotation shaft to be integrally moved with the tire wheel.

18. The apparatus of charging the electric mobility of claim 10, wherein the battery is accommodated in a battery housing made of a non-magnetic material.

19. The apparatus of charging the electric mobility of claim 10, wherein the stopper is positioned between the rotation shaft and the battery.

* * * * *